United States Patent
Crosmer et al.

(10) Patent No.: US 7,509,434 B1
(45) Date of Patent: Mar. 24, 2009

(54) EMBEDDED MILS NETWORK

(75) Inventors: Julianne R. Crosmer, Cedar Rapids, IA (US); Steven E. Koenck, Cedar Rapids, IA (US); Allen P. Mass, Lisbon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 555 days.

(21) Appl. No.: 11/340,096

(22) Filed: Jan. 26, 2006

(51) Int. Cl.
*G06F 15/173* (2006.01)

(52) U.S. Cl. .................. 709/240; 709/223; 709/238; 709/239

(58) Field of Classification Search ......... 709/238–240, 709/223
See application file for complete search history.

(56) References Cited

U.S. PATENT DOCUMENTS

| | | | |
|---|---|---|---|
| 5,995,503 A * | 11/1999 | Crawley et al. | 370/351 |
| 6,262,976 B1 * | 7/2001 | McNamara | 370/254 |
| 6,680,946 B1 * | 1/2004 | Isoyama et al. | 370/395.61 |
| 6,721,800 B1 * | 4/2004 | Basso et al. | 709/239 |
| 6,760,775 B1 * | 7/2004 | Anerousis et al. | 709/238 |
| 6,914,886 B2 * | 7/2005 | Peles et al. | 370/254 |
| 7,266,121 B2 * | 9/2007 | Raisanen | 370/392 |
| 7,408,932 B2 * | 8/2008 | Kounavis et al. | 370/392 |

\* cited by examiner

*Primary Examiner*—Ario Etienne
*Assistant Examiner*—Hussein Elchanti

(57) ABSTRACT

A method for transmitting information having different classification levels within an interconnection network includes transmitting a data word having encoded information that indicates a classification level to a processing environment having a classification level. The encoded information is examined to ascertain the indicated classification level. The classification level of the processing environment is verified by comparing it with the indicated classification level, and the data word is delivered to the processing environment upon verification. An interconnection network for transmitting the data words includes a switched fabric topology with serializer/deserializer devices interconnected by router blocks. A node for connecting to the interconnection network includes a network interface module linking the interconnection network and the processing environment. The network interface module examines data words to ascertain their classification level and verifies the classification level of the processing environment. The network interface module delivers the data words to the processing environment upon verification.

17 Claims, 3 Drawing Sheets

EMBEDDED MILS NETWORK

FIELD OF THE INVENTION

The present invention generally relates to the field of computing networks, and more particularly to an interconnection network for connecting processing environments, including processing environments supporting Multiple Independent Levels of Security (MILS), and maintaining partition and security separation for information transmitted within the interconnection network.

BACKGROUND OF THE INVENTION

Many computing environments process and transmit information having different security classification levels. For example, military computing environments process classified information having security levels such as top secret and secret, as well as unclassified information. Typically, unclassified information is separated from classified information in these computing environments, so that classified information is not improperly passed to an unsecured computing environment. Keeping unclassified information separated from classified information has dictated separate processing environments and interconnection networks, such as separate black processing environments for processing unclassified or encrypted data, and red processing environments for processing unencrypted classified data.

Partitioned processing environments have been developed that enable single processors to host Multiple Independent Levels of Security (MILS). For example, the AAMP7G processor manufactured by Rockwell Collins of Cedar Rapids, Iowa utilizes a National Security Agency (NSA) certified brickwall Partition Management Unit (PMU) to enforce separation of processes, while a MILS Real Time Operating System (RTOS) provides process separation with a software implemented partitioning environment, which can operate on Commercial Off-The-Shelf (COTS) processors.

Connecting these partitioned processing environments to an interconnection network is problematic, as typical interconnection networks are not aware of partition or security separation. For instance, when an Ethernet message (frame) is transmitted from a first processing environment to a second processing environment in an Ethernet network, other processing environments connected to the first and second processing environments via the Ethernet medium may receive and examine the frame, as well.

Thus, it would be desirable to provide an interconnection network for connecting partitioned processing environments while maintaining partition and security separation for information having different security levels transmitted within the interconnection network.

SUMMARY OF THE INVENTION

Accordingly, the present invention is directed to a system and method for transmitting information having different classification levels in an interconnection network while maintaining partition and security separation within the interconnection network.

In one embodiment, the present invention provides a method for transmitting information having different classification levels within an interconnection network. The method includes transmitting a data word having encoded information that indicates a classification level. The encoded information may also include network control information for routing the data word within the interconnection network. An exemplary data word includes an "octet" (eight bits) of network data, two control bits, and two classification/security bits. The data word is transmitted to a node including a processing environment having a classification level. The encoded information is examined at the node to ascertain the indicated classification level of the data word. Then, the classification level of the processing environment is verified by comparing it with the indicated classification level, and the data word is delivered to the processing environment upon verification. If the processing environment is a partitioned processing environment, the data word is delivered to a partition upon verification of the classification level of the partition.

In a second embodiment, the present invention provides a system for transmitting information having different classification levels. The system includes an interconnection network having a switched fabric topology with serializer/deserializer devices interconnected by router blocks. A series of data words may be included in a network packet transmitted within the interconnection network. The network packet has a packet header with a destination parameter identifying the processing environment. A router block directs the network packet to an appropriate output port for a node based on the destination parameter.

In a third embodiment, the present invention provides a node for connecting to the interconnection network and receiving a data word therefrom. The node includes a processing environment having a classification level and a network interface module communicatively coupled between the interconnection network and the processing environment. The node receives the data word, and the network interface module examines the encoded information to ascertain the indicated classification level of the data word, verifying it by comparing the indicated classification level with the classification level of the processing environment. The network interface module delivers the data word to the processing environment upon verification.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally to FIGS. 1 through 4, an interconnection network 100 is described in accordance with exemplary embodiments of the present invention. The interconnection network 100 connects nodes 102 together, forming a community of nodes for transmitting information. The interconnection network 100 supports Multiple Independent Levels of Security (MILS) and interconnects processing environments, including MILS processing environments, for transmitting information having different classification levels (e.g., security levels such as unclassified, "U"; secret, "S"; and top secret, "TS").

In exemplary embodiments, the nodes 102 are computers and/or other devices for processing information. Each node 102 includes a separate processing environment having a classification level within the interconnection network 100, or, alternatively, a partitioned processing environment 104 including a partition having a classification level. Preferably, the partitioned processing environment 104 is configured for maintaining the separation of processes having different classification levels as the processes are carried out on the node 102. For example, the node 102 may include a processor utilizing a Partition Management Unit (PMU) to enforce process separation. Alternatively, the node 102 may provide process separation via a software implemented partitioning environment, such as a MILS Real Time Operating System (RTOS). Those of skill in the art will appreciate that the node 102 may utilize various hardware and software to provide a partitioned processing environment 104 without departing from the scope and intent of the present invention.

Figure 1:
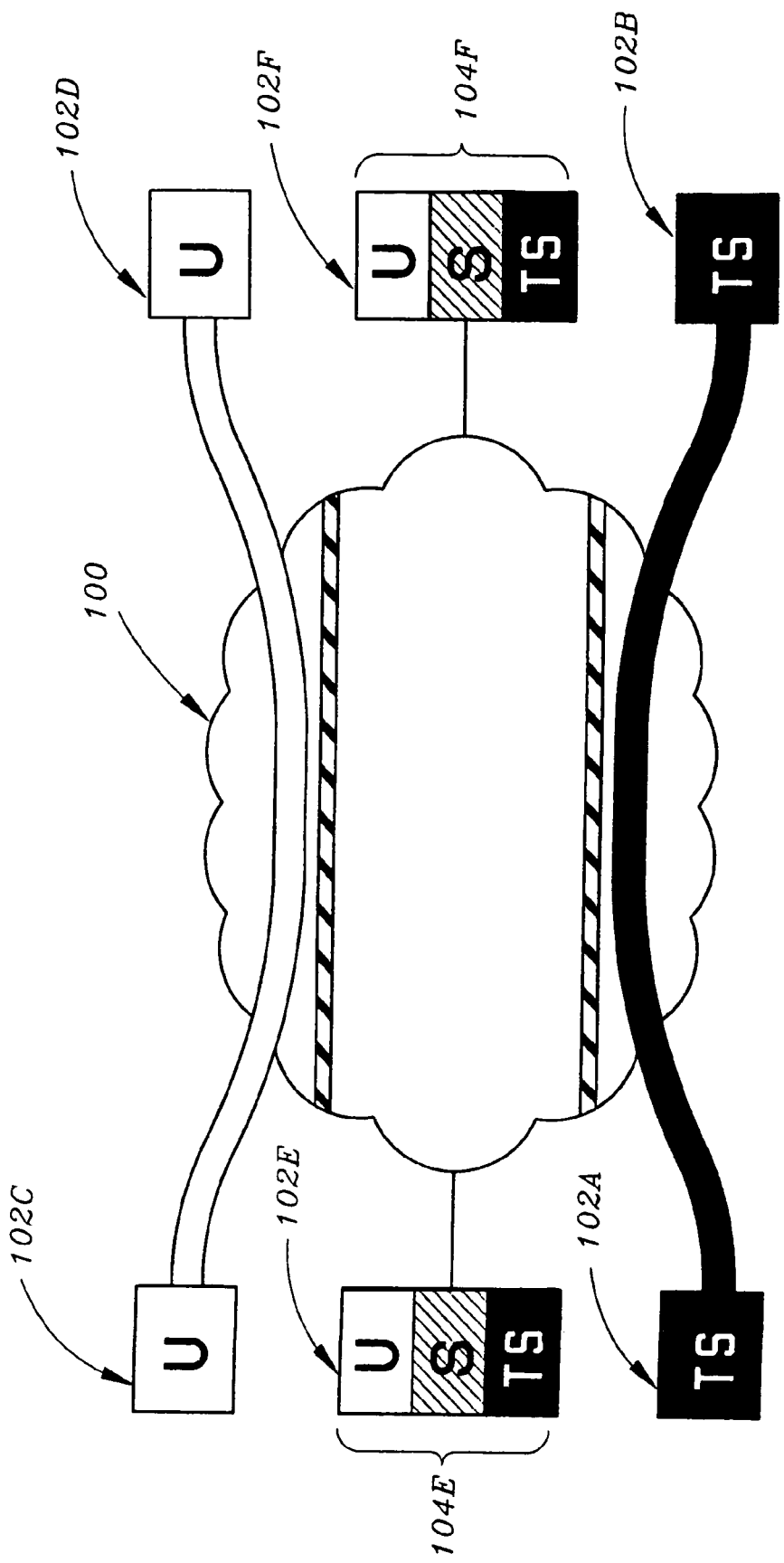
FIG. 1 is a block diagram illustrating a MILS interconnection network for maintaining partition and security separation for network data having different security levels in accordance with an exemplary embodiment of the present invention.
Figure 2:
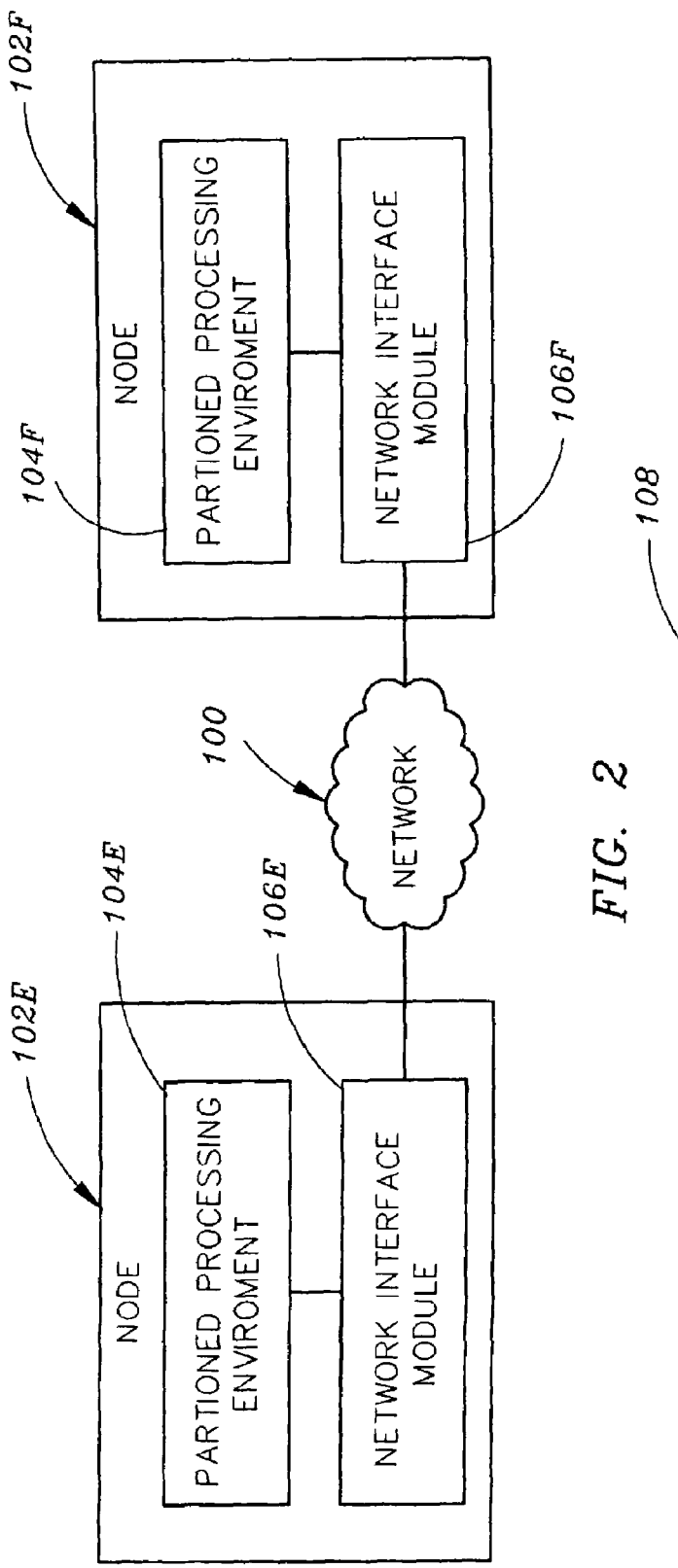
FIG. 2 is a block diagram illustrating two partitioned processing environments connected by the MILS interconnection network illustrated in FIG. 1.

Referring now to FIGS. 1 and 2, the interconnection network 100 connects nodes 102 together for transmitting information having different classification levels between processes carried out on the nodes 102, while maintaining partition and classification separation as the information is transmitted within the interconnection network 100. Preferably, the interconnection network 100 is configured for maintaining classification separation for information transmitted between separate processing environments, as well as for information transmitted between partitioned processing environments 104. For instance, information transmitted between classified nodes 102A and 102B (i.e., nodes having top secret separate processing environments) is separated from information transmitted between unclassified nodes 102C and 102D (i.e., nodes having unclassified separate processing environments). Correspondingly, information transmitted between partitioned processing environments 104E and 104F is separated from information transmitted between classified nodes 102A and 102B, as well as information transmitted between unclassified nodes 102C and 102D. In this manner, classification/security separation for information transmitted between the nodes 102 is maintained within the interconnection network 100.

Preferably, the interconnection network 100 is configured for maintaining partition separation for information transmitted between partitioned processing environments 104E and 104F. For example, a first node 102E sends information having a classification level to a second node 102F via the interconnection network 100. In one instance, the classification level of the information is associated with the classification level of a partition of the first node 102E which originated the information. In another instance, the classification level is associated with the partition. Those of skill in the art will appreciate that the classification level may be associated with the information in a variety of ways, without departing from the scope and spirit of the present invention.

The second node 102F includes another partition (with its own classification level) to which the information is directed. In exemplary embodiments, the second node 102F includes a network interface module 106F communicatively coupled between the interconnection network 100 and the partitioned processing environment 104F. The network interface module 106F receives the information from the first node 102E, examines the classification level of the information, and verifies it by comparing the classification level of the information with the classification level of the second partition. Upon verification, the network interface module 106F delivers the information to the second partition. If the classification level of the information is not verified by the comparison, however, the information is not delivered to the second partition, and the network transport layer (or a similar interface) sends a fault to the first node 102E that originated the information, such as a "NAK-security fault."

In a similar manner, the interconnection network 100 is configured for maintaining classification separation for information transmitted between separate processing environments. For example, a third node 102 sends information having a classification level to a fourth node 102 via the interconnection network 100. In one instance, the classification level of the information is based on the classification level of the separate processing environment of the third node 102. In another instance, the classification level is assigned by the third node 102. Those of skill in the art will appreciate that the classification level may be assigned to the information in a variety of ways, without departing from the spirit and intent of the present invention.

The fourth node 102 includes another separate processing environment (with its own classification level) to which the information is directed. In exemplary embodiments, the fourth node 102 includes a network interface module 106 communicatively coupled between the interconnection network 100 and the separate processing environment. The network interface module 106 receives the information from the third node 102, examines the classification level of the information, and verifies it by comparing the classification level of the information with the classification level of the separate processing environment. Upon verification, the network interface module 106 delivers the information to the separate processing environment. If the classification level of the information is not verified by the comparison, however, the information is not delivered to the separate processing environment, and the network transport layer (or a similar interface) sends a fault to the third node 102 that originated the information, such as a "NAK-security fault."

Figure 3:
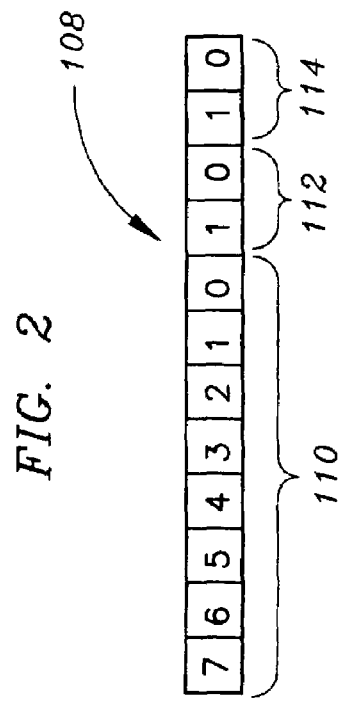
FIG. 3 is a data word layout for transmitting network data within the MILS interconnection network illustrated in FIG. 1.

Referring now to FIG. 3, an exemplary data word 108 for transmitting information (network data) within the interconnection network 100 includes network data bits 110, control bits 112, and security bits 114. Network data is typically formed into eight bit "octets." For example, a network packet may be formed of a series of octets for transmitting the network data. In one specific embodiment, four additional bits are associated with each transmitted and received octet of network data bits 110, and may be used to encode and indicate network control and classification/security information. For instance, two additional bits may be utilized as control bits 112, providing a mechanism for packet framing and control, while two other bits may be utilized as classification/security bits 114, enabling identification of the classification level of each data octet from source to destination:

| Control bits | Security bits |
|---|---|
| 00 Idle | 00 Unclassified |
| 01 Header | 01 Secret |
| 10 Payload | 10 Top secret |
| 11 Frame check | 11 Unassigned |

In another specific embodiment, two additional bits are associated with each transmitted and received octet of network data bits 110, and may be used to encode and indicate network control and classification/security information. For instance, one additional bit may be utilized as a control bit, providing a mechanism for packet framing and control, while another bit may be utilized as a classification/security bit, enabling identification of the classification level of each data octet from source to destination:

| Control bit | Security bit |
|---|---|
| 0 Idle | 0 Classified |
| 1 Data | 1 Unclassified |

In exemplary embodiments, when a network interface module 106 receives a data word 108 from a node 102, the network interface module 106 ascertains the classification level of the data word 108 by examining the security bits 114 received with the network data bits 110, and verifies it by comparing the classification level indicated by the security bits 114 with the classification level of the processing environment or partition to which the data word 108 is directed. In an advantageous embodiment, the infrastructure of the interconnection network 100 is configured for utilizing the control bits 112 (and possibly routing information, which may be included in a packet header, or the like) to route packets to an appropriate destination node 102. Those of skill in the art will appreciate that while the data word 108 has been described with some specificity to include eight network data bits 110, two control bits 112, and two security bits 114, the data word 108 is exemplary and not meant to be restrictive of the invention. For example, it is contemplated that other data words 108 may include more or fewer bits, as well as various combinations of network data bits, control bits, and security bits. Thus, another exemplary data word includes network data bits 110 and security bits 114 without control bits 112.

Figure 4:
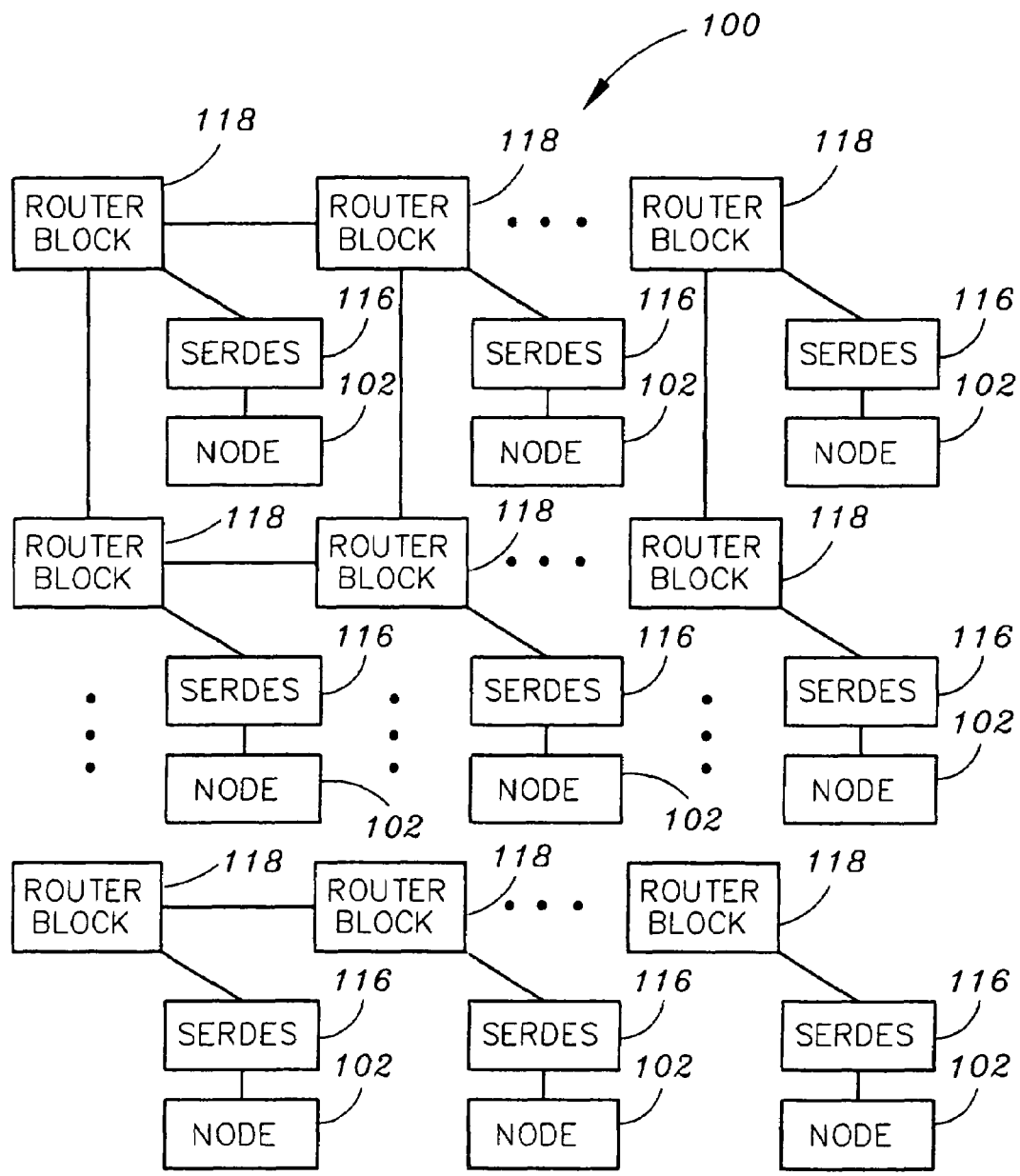
FIG. 4 is a block diagram illustrating a MILS interconnection network having a switched fabric topology with serializer/deserializer (SERDES) devices interconnected by a grid of router blocks in accordance with an exemplary embodiment of the present invention.

Referring now to FIG. 4, an exemplary interconnection network 100 includes a switched fabric topology with serializer/deserializer (SERDES) devices 116 interconnected by a grid of router blocks 118. The router blocks 118 provide network access for each node 102 and perform network interconnection by directing incoming network packets (i.e., a series of data words 108) to an appropriate output port based on a destination parameter in the packet header. For instance, Fairchild Semiconductor™ FIN12A SERDES devices 116 may be utilized with the interconnection network 100 for receiving and transmitting twelve bit data words 108. Those of skill in the art will appreciate that the interconnection network 100 is exemplary and explanatory only, and that other hardware for interconnecting the SERDES devices 116, as well as other network topologies, may be utilized with data words 108 of the present invention.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for transmitting information having different classification levels in an interconnection network, comprising:
   providing a data word including encoded information indicating a classification level;
   receiving the data word at a node including a processing environment to which the data word is directed, the processing environment having a classification level;
   examining the encoded information at the node to ascertain the indicated classification level of the data word;
   verifying by comparing the indicated classification level with the classification level of the processing environment; and
   delivering the data word to the processing environment upon verification, wherein the processing environment includes a partition to which the data word is directed, and the data word is delivered to the partition upon verification of the classification level of the partition.

2. The method as claimed in claim 1, wherein the encoded information includes network control information for routing the data word to the node.

3. The method as claimed in claim 2, wherein the data word includes at least one control bit indicating the network control information and at least one security bit indicating the classification level of the data word.

4. The method as claimed in claim 1, wherein the interconnection network comprises a switched fabric topology with serializer/deserializer devices interconnected by router blocks.

5. The method as claimed in claim 4, wherein the data word is included in a network packet having a packet header including a destination parameter identifying the node, and the step of providing the data word includes utilizing a router block to direct the network packet to an appropriate output port for the node based on the destination parameter.

6. The method as claimed in claim 1, further comprising returning a fault via the interconnection network if the classification level of the processing environment is not verified.

7. A node for connecting to an interconnection network and receiving a data word therefrom, the data word having encoded information indicating a classification level, the node comprising:
   a processing environment to which the data word is directed, the processing environment having a classification level; and
   a network interface module communicatively coupled between the interconnection network and the processing environment for examining the encoded information to ascertain the indicated classification level of the data word and verifying by comparing the indicated classification level with the classification level of the processing environment,
   wherein the network interface module delivers the data word to the processing environment upon verification, wherein the processing environment includes a partition to which the data word is directed, and the network interface module compares the indicated classification level with the classification level of the partition and delivers the data word to the partition upon verification.

8. The node as claimed in claim 7, wherein the encoded information includes network control information for routing the data word to the node.

9. The node as claimed in claim 8, wherein the data word includes at least one control bit indicating the network control information and at least one security bit indicating the classification level of the data word.

10. The node as claimed in claim 7, wherein the interconnection network comprises a switched fabric topology with serializer/deserializer devices interconnected by router blocks.

11. The node as claimed in claim 10, wherein the data word is included in a network packet having a packet header including a destination parameter identifying the node, and a router block directs the network packet to an appropriate output port for the node based on the destination parameter.

12. The node as claimed in claim 7, wherein the network interface module returns a fault via the interconnection network if the classification level of the processing environment is not verified.

13. A system for transmitting information having different classification levels, comprising:
   means for sending a data word to a processing environment having a classification level, the data word including encoded information indicating a classification level;
   means for examining the encoded information to ascertain the indicated classification level of the data word;
   means for verifying by comparing the indicated classification level with the classification level of the processing environment; and
   means for delivering the data word to the processing environment upon verification, wherein the processing environment includes a partition to which the data word is directed, the verification means compares the indicated classification level with the classification level of the partition, and the delivery means delivers the data word to the partition upon verification.

14. The system as claimed in claim 13, wherein the encoded information includes network control information for routing the data word to the processing environment.

15. The system as claimed in claim 14, wherein the data word includes at least one control bit indicating the network control information and at least one security bit indicating the classification level of the data word.

16. The system as claimed in claim 13, wherein the sending means comprises an interconnection network having a switched fabric topology with serializer/deserializer devices interconnected by router blocks.

17. The system as claimed in claim 16, wherein the data word is included in a network packet having a packet header including a destination parameter identifying the processing environment, and the sending means utilizes a router block to direct the network packet to an appropriate output port for the node based on the destination parameter.

* * * * *